United States Patent
Zhang et al.

(10) Patent No.: US 11,304,232 B2
(45) Date of Patent: Apr. 12, 2022

(54) WIRELESS FRAME TRANSMISSION METHOD AND APPARATUS

(71) Applicant: XI'AN ZHONGXING NEW SOFTWARE CO., LTD., Shaanxi (CN)

(72) Inventors: Bo Zhang, Guangdong (CN); Kaiying Lv, Guangdong (CN); Bo Sun, Guangdong (CN); Chen Lu, Guangdong (CN)

(73) Assignee: XI'AN ZHONGXING NEW SOFTWARE CO., LTD.

( * ) Notice: Subject to any disclaimer, the term of this patent is extended or adjusted under 35 U.S.C. 154(b) by 36 days.

(21) Appl. No.: 16/629,700

(22) PCT Filed: May 24, 2018

(86) PCT No.: PCT/CN2018/088278
§ 371 (c)(1),
(2) Date: Jan. 9, 2020

(87) PCT Pub. No.: WO2019/011065
PCT Pub. Date: Jan. 17, 2019

(65) Prior Publication Data
US 2021/0084686 A1    Mar. 18, 2021

(30) Foreign Application Priority Data
Jul. 11, 2017 (CN) .......................... 201710561914.9

(51) Int. Cl.
*H04W 4/00* (2018.01)
*H04W 74/08* (2009.01)
(Continued)

(52) U.S. Cl.
CPC ...... *H04W 74/0816* (2013.01); *H04B 7/0617* (2013.01); *H04W 72/0446* (2013.01); *H04W 74/002* (2013.01)

(58) Field of Classification Search
CPC ........... H04W 74/0816; H04W 74/002; H04W 72/0446; H04B 7/0617
(Continued)

(56) References Cited

U.S. PATENT DOCUMENTS

2017/0188368 A1    6/2017  Cariou et al.
2017/0188376 A1*   6/2017  Noh ..................... H04W 72/085

FOREIGN PATENT DOCUMENTS

CN    105812295    7/2016
CN    106603211    4/2017
(Continued)

OTHER PUBLICATIONS

European Search Report dated Feb. 18, 2021; European Patent Application No. 18832969.2.
(Continued)

*Primary Examiner* — Thai D Hoang
(74) *Attorney, Agent, or Firm* — McDonald Hopkins LLC (57) ABSTRACT

Embodiments of the present disclosure provide a radio frame transmission method, including: receiving a radio frame, and determining that the radio frame is a radio frame of a specified type and/or that the radio frame carries indication information indicating that reusing of the radio frame by a third party is disallowed, and maintaining a physical carrier channel detection state to be busy until the radio frame ends. Embodiments of the present disclosure further provide a wireless transmission apparatus and a computer storage medium.

15 Claims, 4 Drawing Sheets

---

A station receives a radIo frame, and determines that the radio frame is of a specified type and/or that the radio frame carries indication information indicating that reusing of the radio frame by a third party is disallowed — 11

Maintain a physical carrier channel detection state to be busy until the radio frame ends — 12

(51) Int. Cl.
*H04B 7/06* (2006.01)
*H04W 72/04* (2009.01)
*H04W 74/00* (2009.01)

(58) Field of Classification Search
USPC .......... 370/329–330, 335–345, 347–348
See application file for complete search history.

(56) References Cited

FOREIGN PATENT DOCUMENTS

| CN | 106879004 | 6/2017 | |
|---|---|---|---|
| EP | 3307007 A1 | 4/2018 | |
| WO | 2016195442 A1 | 12/2016 | |
| WO | WO-2016195442 A1 * | 12/2016 | ......... H04L 27/0006 |

OTHER PUBLICATIONS

Patent Cooperation Treaty (PCT), International Search Report and Written Opinion for Application PCT/CN2018/088278 filed on May 24, 2018, dated Aug. 16, 2018, International Searching Authority, CN.

* cited by examiner

WIRELESS FRAME TRANSMISSION METHOD AND APPARATUS

CROSS-REFERENCE TO RELATED APPLICATION

This application is a 35 U.S.C. 371 national stage filing of PCT Application No. PCT/CN2018/088278 filed on May 24, 2018, which claims priority to Chinese patent application No. 201710561914.9 filed on Jul. 11, 2017, the content of both which are incorporated herein by reference in their entirety.

TECHNICAL FIELD

The present disclosure relates to the field of wireless communications and, in particular, relates to a radio frame transmission method, apparatus and a computer storage medium.

BACKGROUND

At present, the number of various Internet of Things devices in a wireless communication system is increased rapidly, the network load is getting heavier, and the communication efficiency is also decreased accordingly. A spatial reuse technology can mitigate this decline in efficiency, but for some frame sequences, success of their transmission is related to success of subsequent frame switching. In wireless communications, some frame sequences need to be strictly protected from being reused by other stations.

The spatial reuse technology enables stations in different basic service sets (BSSs) to reuse the same channel at the same time for transmission, thereby improving the network throughput. The basic principle of the spatial reuse is that when a frame of an overlapping basic service set (OBSS) is received and a received power is detected to be less than a certain threshold, the frame may be ignored, a channel is considered to be idle, and the backoff is performed to contending to access to the channel for data transmission. However, for a sender in the BSS, the transmission duration of some frames is not expected to be reused by third-party stations in the OBSS. If the transmission duration is reused, the transmission effect will be poor, and the subsequent data transmission may even be affected.

SUMMARY

Embodiments of the present disclosure provide a radio frame transmission method, apparatus and a computer storage medium, so as to ensure the transmission success rate of the specified type radio frame and improve the transmission efficiency of a network.

A radio frame transmission method is provided in the embodiments of the present disclosure and includes steps described below.

A radio frame is received, and it is determined that the radio frame is of a specified type and/or that the radio frame carries indication information indicating that reusing of the radio frame by a third party is disallowed.

A physical carrier channel detection state is maintained to be busy until the radio frame ends.

A radio frame transmission apparatus is further provided in the embodiments of the present disclosure and includes a determining module and a transmission module.

The determining module is configured to receive a radio frame, and determine that the radio frame is of a specified type and/or determine that the radio frame carries indication information indicating that reusing of the radio frame by a third party is disallowed.

The transmission module is configured to maintain a physical carrier channel detection state to be busy until the radio frame ends.

A radio frame transmission method is further provided in the embodiments of the present disclosure and includes: sending a radio frame, where the radio frame is a radio frame of a specified type and/or the radio frame carries indication information indicating that reusing of the radio frame by a third party is disallowed.

A radio frame transmission apparatus is further provided in the embodiments of the present disclosure and includes a sending module.

The sending module is configured to send a radio frame, where the radio frame is a radio frame of a specified type and/or the radio frame carries indication information indicating that reusing of the radio frame by a third party is disallowed.

A radio frame transmission apparatus is further provided in the embodiments of the present disclosure and includes a processor and a memory for storing computer programs executable by the processor. The processor is configured to perform steps of the radio frame transmission method applied to a receiving side when executing the computer programs.

Alternatively, the processor is configured to execute steps of the radio frame transmission method applied to a sending side when executing the computer programs.

The embodiments of the present disclosure further provide a computer storage medium, which is configured to store computer programs. When executed by a processor, the computer programs implement steps of the radio frame transmission method applied to a receiving side described in the embodiments of the present disclosure; or when executed by the processor, the computer programs implement steps of the radio frame transmission method applied to the sending side described in the embodiments of the present disclosure.

A radio frame transmission method, apparatus and a computer-readable storage medium are provided in the embodiments of the present disclosure. It is determined that a radio frame is of a specified type and/or that the radio frame carries indication information indicating that reusing of the radio frame by a third party is disallowed, and a physical carrier channel detection state is maintained to be busy until the radio frame ends, such that the transmission success rate of the specified type radio frame is ensured and the transmission efficiency of a network is improved.

DETAILED DESCRIPTION

Objects, technical solutions and advantages of the present invention will be clearer from a detailed description of the embodiments of the present invention in conjunction with the drawings. It is to be noted that if not in collision, the embodiments and features therein in the present application may be combined with each other.

Embodiment One

Figure 1:
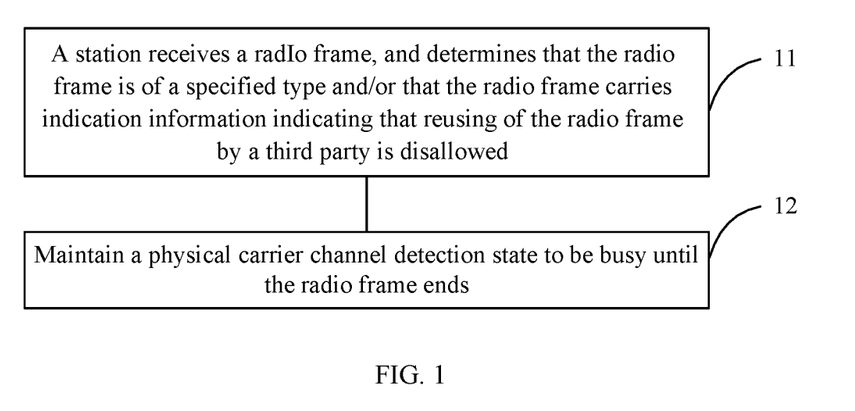
FIG. 1 is a flowchart of a radio frame transmission method according to an embodiment of the present disclosure.

FIG. 1 is a flowchart of a radio frame transmission method according to an embodiment of the present disclosure, and the radio frame transmission method is applied to a receiving side. As shown in FIG. 1, the method of the embodiment includes steps described below.

In step 11, a station receives a radio frame, and determines that the radio frame is a radio frame of a specified type and/or that the radio frame carries indication information indicating that reusing of the radio frame by a third party is disallowed.

In step 12, a physical carrier channel detection state is maintained to be busy until the radio frame ends.

In an embodiment, in a transmitting process of the radio frame, the method further includes the step of maintaining a network allocation vector of the receiving station unchanged.

In an embodiment, before determining the radio frame to be the radio frame of the specified type, the method further includes the step of determining the radio frame carries the indication information indicating that reusing of the radio frame by a third party is disallowed.

In an embodiment, before determining the radio frame to be the radio frame of the specified type, the method further includes the step of determining that receiving power of the radio frame is less than a power detection threshold of an overlapping basic service set.

In an embodiment, the step of determining that the radio frame carries the indication information indicating that reusing of the radio frame by a third party is disallowed includes: paring a spatial reuse parameter information domain of a physical layer signaling domain, where the spatial reuse parameter information domain is spatial-reuse-disallow instruction information.

In the embodiment, the radio frame of the specified type includes any one of: a null data packet (NDP) frame, a null data packet announcement (NDPA) frame, a beamforming report poll trigger frame, a beamforming feedback frame, a radio frame with response information, a radio frame having a length satisfying a certain condition, or a radio frame with a positioning function.

The radio frame having the length satisfying the certain condition includes: a radio frame whose media access control layer frame length or physical layer frame length is less than a threshold.

The radio frame includes a triggered radio frame.

In an embodiment, in a process of receiving the radio frame, the method further includes: updating a network allocation vector.

In an embodiment, the step of determining the radio frame to be the radio frame of the specified type includes: determining the radio frame to be the null data packet frame in response to determining that a length and a number of spatial streams in physical layer signaling satisfy a specified matching condition.

The method of the embodiment may ensure the transmission success rate of the radio frame of the specified type.

Figure 2:
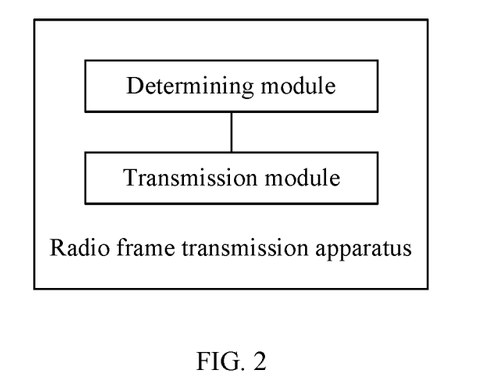
FIG. 2 is a schematic diagram of a radio frame transmission apparatus according to an embodiment of the present disclosure.

Accordingly, the embodiment provides a radio frame transmission apparatus. As shown in FIG. 2, the apparatus of the embodiment includes a determining module and a transmission module.

The determining module is configured to: after a radio frame is received, determine the radio frame to be a radio frame of a specified type and/or determine the radio frame carries indication information indicating that reusing of the radio frame by a third party is disallowed.

The transmission module is configured to maintain a physical carrier channel detection state to be busy until the radio frame ends.

In an embodiment, the determining module is configured to: before determining the radio frame to be the radio frame of the specified type, determine that the radio frame carries the indication information indicating that reusing of the radio frame by a third party is disallowed.

In an embodiment, the determining module is configured to determine that receiving power of the radio frame is less than a power detection threshold of an overlapping basic service set before determining the radio frame to be the radio frame of the specified type.

In an embodiment, the determining module is configured to parse a spatial reuse parameter information domain of a physical layer signaling domain, wherein the spatial reuse parameter information domain is spatial-reuse-disallow instruction information.

In an embodiment, the determining module is configured to determine that the radio frame of the specified type includes any one of: a null data packet (NDP) frame, a null data packet announcement (NDPA) frame, a beamforming report poll trigger frame, a beamforming feedback frame, a radio frame with response information, a radio frame having a length satisfying a certain condition, or a radio frame with a positioning function.

In an embodiment, a transceiving transmission module is further configured to maintain a current network allocation vector unchanged in a process of transmitting the radio frame.

The radio frame having the length satisfying the certain condition includes a radio frame having a media access control layer frame length or a physical layer frame length less than a threshold, where the radio frame includes a triggered radio frame.

The step of determining the radio frame to be the radio frame of the specified type includes that the radio frame is determined to be the null data packet frame in response to determining that a length and a number of spatial streams in physical layer signaling satisfy a specified matching condition.

In an embodiment, the transceiving transmission module is further configured to update a network allocation vector in a process of receiving the radio frame.

It is to be noted that: the division of the above program modules of the radio frame transmission apparatus in the above embodiment during the radio frame transmission is merely illustrative. In practical applications, the above processing may be distributed and performed by different program modules according to needs, that is, the internal structure of the apparatus is divided into different program modules to perform all or part of the above processing. In addition, the radio frame transmission apparatus in the above embodiment has the same concept as the radio frame transmission method in the method embodiment. For the specific implementation process of the radio frame transmission apparatus, reference may be made to the method embodiment, which is not repeated herein.

Accordingly, a radio frame transmission apparatus is provided in the embodiment and includes a processor and a memory for storing computer programs executable on the processor. The processor is configured to, when executing the computer programs, perform the above radio frame transmission method in the present disclosure.

Accordingly, a computer storage medium is further provided in the embodiments of the present disclosure and is configured to store computer programs, where when executed by a processor, the computer programs implement the above radio frame transmission method.

Embodiment Two

A radio frame transmission method is provided in the embodiments of the present disclosure. The method is applied in a transmitting station and includes steps described below.

In step 21, a radio frame is sent, and the radio frame is a radio frame of a specified type and/or carries indication information indicating that reusing of the radio frame by a third party is disallowed.

When the radio frame is of the specified type, a spatial reuse parameter information domain of a physical layer signaling domain of the radio frame carries the indication information indicating that reusing of the radio frame by a third party is disallowed.

In the embodiment, the radio frame of the specified type includes any one of: a null data packet (NDP) frame, a null data packet announcement (NDPA) frame, a beamforming report poll trigger frame, a beamforming feedback frame, a radio frame with response information, a radio frame having a length satisfying a certain condition, or a radio frame with a positioning function.

The radio frame having the length satisfying the certain condition includes a radio frame having a media access control layer frame length or a physical layer frame length less than a threshold.

Indication information indicating that reusing of the radio frame by a third party is disallowed is carried in the above radio frame, and the radio frame is sent, indicating that all third party stations receiving the frame with the spatial reuse indication set the carrier sensing to busy until the radio frame ends.

Accordingly, a radio frame transmission apparatus is provided in the embodiments and includes a sending module.

The sending module is configured to send a radio frame, and the radio frame is a radio frame of a specified type and/or carries indication information indicating that reusing of the radio frame by a third party is disallowed.

In an embodiment, in response to the radio frame is the radio frame of the specified type, a spatial reuse parameter information domain of a physical layer signaling domain of the radio frame carries the indication information indicating that reusing of the radio frame by a third party is disallowed.

In an embodiment, the radio frame of the specified type includes any one of: a null data packet (NDP) frame, a null data packet announcement (NDPA) frame, a beamforming report poll trigger frame, a beamforming feedback frame, a radio frame with response information, a radio frame having a length satisfying a certain condition or a radio frame with a positioning function.

The radio frame having the length satisfying the certain condition includes a radio frame whose physical layer frame length is less than a threshold.

It is to be noted that: the division of the above program modules of the radio frame transmission apparatus in the above embodiment during the radio frame transmission is merely illustrative. In practical applications, the above processing may be distributed and performed by different program modules according to needs, that is, the internal structure of the apparatus is divided into different program modules to perform all or part of the above processing. In addition, the radio frame transmission apparatus in the above embodiment has the same concept as the radio frame transmission method in the method embodiment. For the specific implementation process of the radio frame transmission apparatus, reference may be made to the method embodiment, which is not repeated herein.

Accordingly, a radio frame transmission apparatus is provided in the embodiment and includes a processor and a memory for storing computer programs executable on the processor. The processor is configured to perform the above radio frame transmission method in the present disclosure when executing the computer programs.

Accordingly, a computer storage medium is further provided in the embodiments of the present disclosure and is configured to store computer programs, where when executed by a processor, the computer programs implement the above radio frame transmission method.

Embodiment Three

Figure 3:
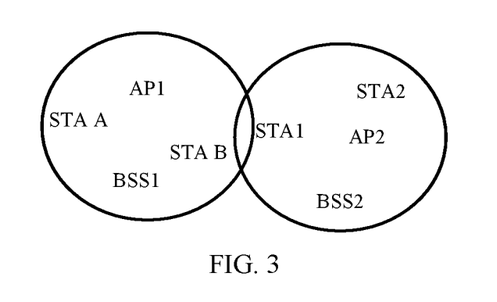
FIG. 3 is diagram of a network distribution with two basic service sets (BSSs)

In FIG. 3, a access point 1 (AP1) in a BBS1 initiates a downlink channel measurement sequence through sending a null data packet announcement (NDPA) frame with a high efficiency (HE) single user (SU) physical packet data unit (PPDU) frame format, and a spatial reuse (SR) subfield in a spatial reuse domain in a high efficiency signal A domain signaling in the HE SU PPDU is configured as spatial reuse disallow/limit signaling (SR-DISALLOW), for prohibiting/limiting a third party station from performing the spatial reuse, which includes a non-SRG/SRG OBSS-PD based. A access point (AP) generates a legacy short training field (L-STF), a legacy long training field (L-LTF), legacy signaling (L-SIG), repeat legacy signaling (RL-SIG), the HE-SIG-A, a high efficiency short training field (HE-STF), a high efficiency long training field (HE-LTF) and data fields. The data field in the physical layer is data information carrying the NDPA frame in a medium access control (MAC) layer. The physical layer performs an orthogonal frequency division multiplexing (OFDM) transform on each field in a corresponding manner, performs framing, and generates a baseband HE SU PPDU, performs pulse-shaping, modulates it to 5 GHz by a mixer, and performs signal transmission.

OBSS station, a station STA2 in a BSS2 in FIG. 3, receives one radio frame, performs matching through a L-STF training field in the physical layer, and determines that the frame is a wireless fidelity (Wi-Fi) radio frame. The OBSS station sets a physical carrier sensing channel detection state to busy, and determines that the frame is an HE radio frame through the L-SIG and repeat legacy signaling (RL-SIG). The OBSS station parses a BSS color in the HE-SIG-A and obtains that the frame is from the OBSS station. The OBSS station further parses the spatial reuse domain of the HE-SIG-A and obtains that the spatial reuse domain is the spatial-reuse-disallow instruction SR-DIALLOW, and maintains the physical carrier sensing channel detection state to be busy until the radio frame ends.

Embodiment Four

Figure 4:
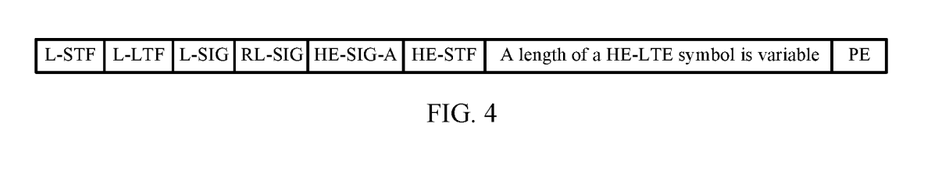
FIG. 4 is a schematic diagram of a Null Data Packet (NDP) structure.

In FIG. 3, a station AP1 in a BSS1 network sends an HE null data packet (NDP) PPDU frame for measuring a downlink channel from the AP1 to a STA A or a downlink channel from the AP1 to a STA B. When the HE NDP PPDU frame is sent by the AP1, the HE NDP PPDU has no data field, as shown in FIG. 4.

A spatial reuse domain in an HE-SIG-A of physical layer signaling is configured to the spatial-reuse-disallow instruction SR-DISALLOW. The HE-LTF of the PPDU is used for enabling a beamforming receiver to measure a quality of a channel from a beamforming transmitter to the beamforming receiver, where the measured information may include information such as a channel steering matrix, a signal-to-noise ratio (SNR) of the channel, a fluctuation of the channel, and the like.

A station STA2 in an OBSS network, that is, in a BSS2, receives a radio frame. By energy detection and L-STF matching, the station STA2 determines that the frame is a Wi-Fi radio frame. By repeating L-SIG, the station STA2 determines that the frame is an HE PPDU. The station STA2 determines, through a BSS color domain, that the frame is from the OBSS network. The station STA2 parses a SR domain in the HE-SIG-A and determines that the SR domain is SR-DISALLOW, and receives the radio frame in a non-spatial-reuse function flow, which includes disallowing OBSS_PD and SRP SR spatial reuse. The physical carrier channel detection state is busy until the radio frame ends.

Embodiment Five

In FIG. 3, an AP1 station in a BSS1 network sends a channel measurement frame based on a 802.11ax frame format PPDU frame, that is, HE SU NDP PPDU frame, for measuring a downlink channel from the AP1 to a STA A and a downlink channel from the AP1 to a STA B. The HE NDP PPDU frame sent by the AP1 is shown in FIG. 4.

A spatial reuse domain in an HE-SIG-A domain of the physical layer signaling is configured to the spatial-reuse-disallow instruction SR-DISALLOW. HE-LTF of a PPDU is used for enabling a beamforming receiver to measure a quality of a channel from a beamforming transmitter to the beamforming receiver, where the measured information may include information such as a channel steering matrix, a signal-to-noise ratio (SNR) of the channel, a fluctuation of the channel, and the like.

A station STA2 in an OBSS network, that is, in a BSS2, receives a radio frame. By energy detection and L-STF matching, the station STA2 determines that the frame is a Wi-Fi radio frame. By repeating L-SIG, the station STA2 determines that the frame is an HE PPDU. The station STA2 parses a length domain in the L-SIG signaling and a Nsts domain in the HE-SIG-A, and determines, according to a matching relationship, the frame is an NDP frame. By the BSS color domain, the station STA2 determines that the frame is from the OBSS network. The station STA2 receives the radio frame in a non-spatial-reuse function flow is received, which includes disallowing OBSS_PD and SRP SR spatial reuse, and setting the physical carrier channel detection state to be busy until the radio frame ends.

Embodiment Six

In FIG. 3, an AP1 station in a BSS1 network sends an HE NDP PPDU frame for measuring a downlink channel from the AP1 to a STA A and a STA B. When the HE NDP PPDU frame is sent by the AP1, the HE NDP PPDU has no data field, as shown in FIG. 4. The AP sets a spatial reuse domain in an HE-SIG-A domain of physical layer signaling in the HE NDP PPDU to SR-DISALLOWED. The HE-LTF of the PPDU is used for enabling a beamforming receiver to measure a quality of a channel from a beamforming transmitter to the beamforming receiver, where the measured information may include information such as a channel steering matrix, a signal-to-noise ratio (SNR) of the channel, a fluctuation of the channel, and the like.

A station in a BSS2 receives one radio frame, determines, according to preamble matching, the frame is a Wi-Fi frame, and then determines, through repeating L-SIG, the frame is an HE PPDU. Further, the station parses a BSS color field in the HE-SIG-A signaling and determines that the PPDU is from an OBSS station. The station determines, according to an OBSS_PD threshold, that the receiving energy is less than the OBSS_PD threshold, parses a spatial reuse field in the HE-SIG-A signaling, and determines that the field is SR-DISALLOW. This station maintains the physical carrier sensing state to be busy until the PPDU ends.

Embodiment Seven

In FIG. 3, an AP1 in a BSS1 network sends a trigger frame for scheduling a station STA A and a station STA B in the BSS1, where the trigger frame is a beamforming report poll for feeding back the channel measurement information. The AP uses this variant trigger frame to measure a quality of a channel from the AP to the stations STA and schedule multiple stations to feedback measured channel states, where a channel state class may be indicated in an NDPA frame and include a steering matrix, a signal-to-noise ratio (SNR) of each space-time stream, the channel information of portion of the bandwidth or of the entire bandwidth. The AP1 sets the spatial reuse domain in the common information domain (Common Info) in the trigger frame generated with beamforming report poll to SR-DISALLOWED for configuring a destination receiver of the trigger frame to response to the spatial reuse information domain in the physical layer signaling domain of the trigger-based PPDU.

For spatial reuse information of common information in a same trigger frame, an OBSS station receiving the trigger based-PPDU is prohibited/limited to execute the spatial reuse, which includes: not executing a spatial reuse parameter (SRP) spatial reuse, a packet detection (OBSS_PD), a spatial reuse group (SRG), the spatial reuse and an OBSS_PD NON SRG spatial reuse.

On a receiving side:

When the station STA A and STA B in the BSS1 network receive the PPDU carrying the beamforming report poll frame from the AP1, the stations STA perform feature matching through L-STF, determine that the frame is a Wi-Fi physical frame, and determine that the frame is an HE PPDU through L-SIG and RL-SIG. The stations STA further parse the HE-SIG-A signaling domain in the physical layer and determine that the frame is from the same BSS according to network color information in the BSS network color domain. The station STA parses out the beamforming report poll frame sent to it, and sends a beamforming feedback frame by using a trigger-based PPDU physical layer format after a short interframe space (SIFS). The spatial reuse information domain of the physical layer signaling domain is configured to the spatial-reuse-disallow/limit indication set in the common information domain in the received beamforming report poll frame.

The station STA1 in a BBS2 detects that the signal receiving energy exceeds −62 dBm, and determines that this frame is Wi-Fi frame through feature matching. Through the L-SIG and the RL-SIG, the station STA1 determines that the frame is the HE PPDU. The station STA1 further parses the network color information in the BSS network color domain in a field of the physical layer HE-SIG-A signaling domain and determines that the frame is from an OBSS network. The station STA1 parses the spatial reuse domain and determines that this domain is SR-DISALLOW. Therefore, the station STA1 sets the physical carrier detection channel sensing to be busy, which includes prohibiting OBSS_PD reuse and SRP/SR spatial reuse until the radio frame ends.

Embodiment Eight

On a transmitting end:

In a BSS1, an AP1 sets a spatial reuse domain in physical layer HE-SIG-A signaling to SR-DISALLOW when sending an HE SU PPDU including a beamforming report poll frame, where the SR-DISALLOW instructs an OBSS station receiving the frame to prohibit all SR operations.

On a receiving end:

Stations STA A and STA B in the BBS1 receive a variant trigger frame (the beamforming report poll frame) that is sent by the AP1. Different stations will adjust transmitting power according to a target RSSI information indication in the trigger frame, so that a power of a sent signal reaching the AP1 approximately satisfies a certain error level after path loss, perform synchronization according to a training field in the trigger frame, the synchronization including a carrier frequency offset (CFO) synchronization, and make time error be limited within ±0.4 us. After the above calibration is completed, the STA A and STA B send beam forming feedback through a PPDU based on the trigger frame, where feedback information may include a channel steering matrix, an SNR of a spatial stream of each subcarrier or channel quality indication (CQI) information.

The station STA1 in a BBS2 receives a radio frame, and determines that the frame is a Wi-Fi frame through feature matching. The station STA1 determines that the frame is an HE PPDU through L-SIG and RL-SIG. The station STA1 parses a frame format domain (Format) in the physical layer HE-SIG-A and determines that the domain indicates that the frame is the HE SU PPDU. Through the BSS color in the HE-SIG-A, the station STA1 determines that the frame is from the OBSS station. The station STA1 parses the spatial reuse domain and determines that it is SR-DISALLOW, and sets the physical carrier channel detection state sensing of the station to be busy until the receiving of the radio frame ends.

Embodiment Nine

In a WLAN-based wireless network in a place such as a shopping mall, according to a location of a station STA, an AP can position the station and determine human traffic, and the like. The AP measures, through 802.11az protocol, sequence information and time information of different stations to a station by means of a channel sounding frame. A spatial reuse of a positioning sequence is disallowed due to the accuracy requirement of time measurements.

There are a plurality of BSS networks as shown in FIG. 3, where a BSS1 includes an AP1, a station STA A and a station STA B, and a BSS2 includes an AP2, a station STA1 and a station STA2.

Figure 5:
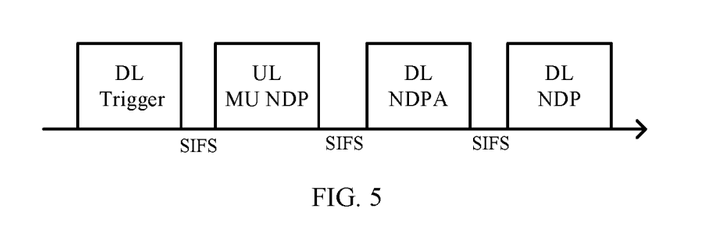
FIG. 5 is a schematic diagram of a station positioning sequence.

In the BBS1, the AP1 sends a positioning request trigger frame including a positioning request, where a Type domain in the trigger frame indicates that the frame is a positioning measuring requirement frame. The station STA A and the station STA B stations are scheduled to send uplink MU NDP. After receiving the uplink MU NDP, the AP1 proceeds to send a downlink NDPA and a downlink NDP. A frame exchange sequence is shown in FIG. 5.

The AP1 uses an HE PPDU frame format in the DL trigger frame. The AP sets SR-DISALLOW in HE-SIG-A of physical layer signaling, and sets a corresponding scheduling information instruction in a MAC layer trigger frame, where the scheduling information instruction includes information such as a received target signal strength indicator and a transmitting power spatial stream, and the like. In addition, the AP1 sets a spatial-reuse-disallow instruction SR-DISALLOW in common information in the trigger frame.

After receiving the above positioning request trigger frame, the station STA A and the station STA B feed back HE MU NDP frames after an SIFS, and the NDP frames are spaced apart in the frequency domain, so that the AP1 can traverse frequency domain NDP signals sent by different stations. The NDP frames sent by the station STA A and station STA B do not include data units, and the frame format is shown in FIG. 4. In addition, information in the common Info domain in the trigger frame of the AP1 is copied in the HE-SIG-A in the HE MU NDP frame, where the information includes the spatial-reuse-disallow instruction SR-DISALLOW.

The AP1 receives information such as the uplink HE MU NDP, a measurement channel, time, and the like sent by the station STA A and the station STA B for positioning. Then, the AP1 sends the downlink NDPA and sets a spatial reuse field in the HE-SIG-A domain in the physical layer signaling to be the spatial-reuse-disallow instruction SR-DISALLOW to ensure that the frame is not reused by other OBSS stations. After the SIFS, the AP1 sends the downlink NDP null data packet frame, and sets the spatial reuse field in the physical layer signaling HE-SIG-A in the NDP frame to be spatial-reuse-prohibit instruction SR-Prohibited.

Any station in a BBS2 as shown in FIG. 4, a station STA1 or a station STA2, receives a radio frame and determines, through type matching, the radio frame is a WiFi radio frame. The station parses a BSS color field in the HE-SIG-A signaling in the physical layer and determines that the frame is from an OBSS station. The station parses the SR domain in the HE-SIG-A and determines that this domain is the spatial-reuse-disallow instruction (SR-DISALLOW). The station STA 1 or the station STA 2 maintains a physical carrier channel detection state to be busy until the radio frame ends.

Embodiment Ten

In a WLAN network, an important data transmission is that a station needs to acknowledge that received data belongs to itself. At present, an amount of downlink data in a network is much larger than that of uplink data, and the protection for downlink data acknowledgement also becomes very important.

Figure 6:
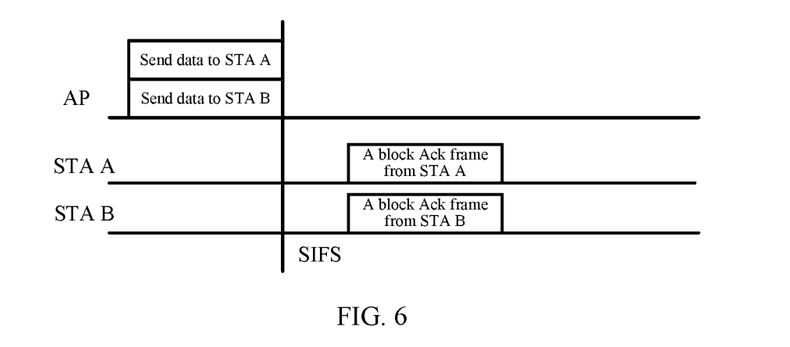
FIG. 6 is a schematic diagram of an uplink multi-block (MU) acknowledgement information according to an embodiment.

The 802.11ax protocol supports multiple block acknowledgement (MU-BA), that is, multiple stations may simultaneously send uplink block acknowledgements in a manner of an orthogonal frequency division multiplexing access (OFDMA). As shown in FIG. 6, an AP1 in a BSS1 network sends multi-user downlink data by means of HE MU, and the station STA A and the station STA B may feed back uplink block Ack (BA) information through OFDMA, MU-MIMO, or a combination of OFDMA and MU-MIMO.

The AP1 sends, in the OFDMA manner, the downlink data in an HE MU PPDU frame format, and then sends a carried trigger frame, and schedules a station to send uplink Ack information, in any one of the following cases:

A frame scheduled by the AP satisfies a designated frame type.

a BA frame/ACK frame and a channel sounding feedback frame.

The frame length of the frame scheduled by the AP satisfies a preset length threshold.

The preset length threshold is 30 bytes.

In the embodiment, the AP sets a spatial-reuse-disallow instruction SR-DISALLOW in a spatial reuse sub-domain of information in a Common Info domain in the trigger frame, that is, all spatial reuse operations are prohibited.

The station STA A and the station STA B reply BA information in an HE Trigger-based PPDU frame format a short interframe space (SIFS) time after receiving the trigger frame. Different stations STAs send the uplink acknowledgement information on the their respective RUs. A spatial reuse field of physical layer signaling HE-SIG-A in the HE Trigger-based PPDU is set to spatial-reuse-disallow/prohibition signaling (SR-DISALLOW) according to the spatial reuse signaling indication in common information in the received trigger frame.

The station STA1, one of stations in the BBS2, receives a radio frame, and the radio frame satisfies a receiving threshold. The station STA1 determines, through signal feature matching, that the frame is a WiFi radio frame, and further determines, through L-SIG and RL-SIG, the frame is an HE PPDU. The station STA1 parses a PPDU format field in the HE-SIG-A signaling and determines that the frame is a Trigger-based PPDU. The station STA1 parses out a BSS color value and determines that the frame is from an OBSS network. The station STA1 parses the spatial reuse field and determines that the spatial reuse field is spatial-reuse-disallow/prohibition signaling SR-DISALLOW. The station STA1 maintains the physical carrier channel detection state to be busy until the radio frame ends.

Embodiment Eleven

Figure 7:
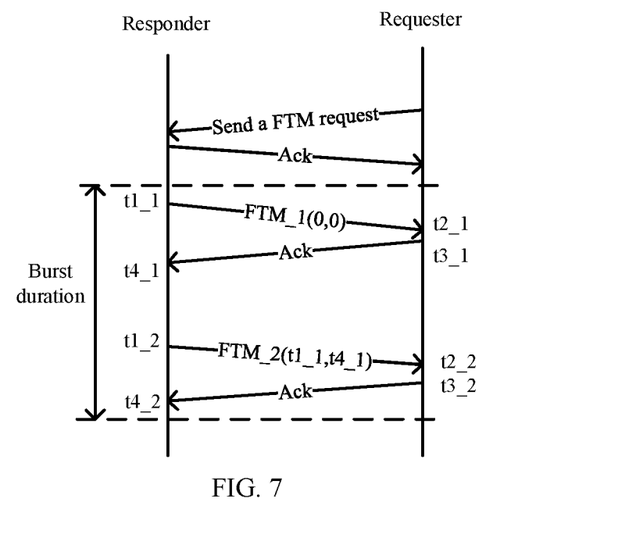
FIG. 7 is a schematic diagram of a position measurement sequence interaction based on a fine time measurement (FTM) request according to an embodiment.

In a fine time measurement (FTM) frame interaction process, time is measured in ms, and the frame interaction needs to be protected and cannot be reused by OBSS stations. The FTM is generally used for measuring a distance between the present station and other stations, and the present station can determine its own position based on the frame interaction and positions of other stations. A frame sequence of the FTM includes: an initiator initiating a FTM request, a responder sending a FTM measurement frame, and the initiator and the responder determining position information by recording receiving time of a PPDU. The frame interaction sequence is shown in FIG. 7.

As shown in FIG. 3, the initiator STA A in the BSS1 requests the AP to perform FTM measurement to measure distance information between the station STA A and the AP1, where the initiator is the station STA A and the responder is the AP1.

The initiator initiates a request through a FTM request frame, and the responder replies with Ack.

The responder sends a first FTM measurement frame at time t1_1 within a burst duration. The requester receives the frame at time t2_1, sends Ack information at time t3_1 and records the time. The responder receives the Ack information at time t4_1 and records time information.

The responder sends the FTM frame at time t1_2, where the FTM frame carries the time t1_1 at which the first FTM measurement frame is sent and the time t4_1 at which the Ack is received.

The requestor receives an FTM2 including the time information at time t2_2, and then estimates the distance from the requestor to the responder through the time information t1_1, t2_1, t3_1, t4_1, and records the time t2_2. The Ack information is sent at time t3_2.

The Ack information is received by the responder at time t4_2, and the time is recorded.

Within one burst duration, multiple measurements may be acknowledged to interaction, and the next one measurement interaction carries the time information of a last measurement Ack.

In the frame sequence interaction sent by the request station and the response station, an FTM request frame, the FTM measurement frame and a response Ack frame sent by the station are in an HE PPDU frame format, and a spatial reuse field of a physical layer HE-SIG-A signaling domain is set to SR-DISALLOW.

In the BBS2, the station STA1 or STA2 receives a radio frame, and the radio frame exceeds a receiving threshold. The station determines, through preamble matching, that the frame is a WiFi frame, and further determines, through repeat L-SIG, that the frame is an HE PPDU. The station determines that this frame is from an OBSS through parsing a BSS color field and an HE-SIG-A signaling domain. The station parses the spatial reuse field and determines that the field tis SR-DISALLOW. Therefore, the station STA1 or STA2 receiving the frame in the BSS2 maintains a physical carrier sensing to be busy until the radio frame ends.

Embodiment Twelve

In a WLAN network, especially in data transmission based on the 802.11 ax protocol, a station may schedule a plurality of stations to send uplink data through a trigger frame. In some simple scenarios, for example, an AP schedules stations to send uplink ACK information, the station may not send a complete trigger frame to the station for scheduling the uplink data, and only needs to put Trigger part information in an uplink multi-user response scheduling (UMRS) control domain. The domain is integrated in an A-Control domain in a high throughput (HT) control domain, but signaling of the UMRS control domain includes no spatial reuse domain. Therefore, the spatial reuse must be forbidden for responding to a frame type having the UMRS domain and scheduling a specific frame type, such as BA or ACK. A default spatial reuse instruction, that is, SR-DIALLOW, may be set, where the SR-DIALLOW indicates that all SR spatial reuses are forbidden.

Figure 8:
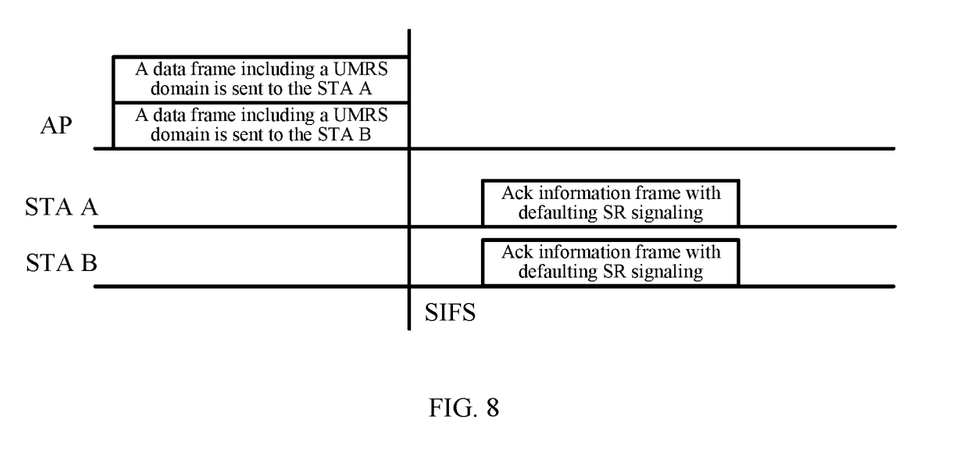
FIG. 8 is a schematic diagram of a data transmission acknowledgement sequence including an uplink multi-user response scheduling (UMRS) Control domain according to an embodiment.

The AP1 in the BSS1 sends a downlink HE MU PPDU through a manner of OFDMA, schedules the STA A and the STA B to send the uplink ACK information, and includes the UMRS Control domain in the first MAC protocol data unit (MPDU) in each multi-user data. After receiving the PPDU, the station will set the default spatial reuse instruction, that is, spatial-reuse disallow. A frame interaction sequence is shown in FIG. 8.

The station STA1 in the BBS2 receives a radio frame, and determines that the frame is a WiFi frame through preamble matching. The station STA1 determines that the frame is an HE PPDU through repeat L-SIG. Further, the station STA1 parses out the HE-SIG-A, and determines, according to the Format domain, that this frame is the HE PPDU based om the trigger frame and determines, through the BSS Color domain, that this frame is from the OBSS station. The station STA1 parses the spatial reuse domain and determines that the spatial reuse domain is spatial reuse disallow information. Therefore, the station STA1 sets a physical carrier sensing to be busy until receiving of the radio frame ends.

Embodiment Thirteen

In a WLAN network, especially in data communication based on the 802.11 ax protocol, an AP may schedule a plurality of stations to send uplink data to improve the average throughput of the network.

Figure 9:
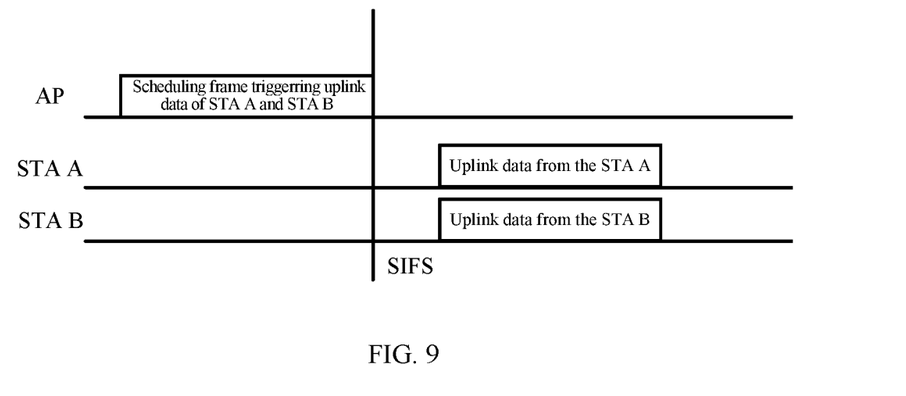
FIG. 9 is a schematic diagram of an access point (AP) scheduling a plurality of stations to transmit uplink data according to an embodiment.

In the case where FIG. 3, an AP1 in a BSS1 network transmits a trigger frame for scheduling stations STA A and STA B to send uplink data, which is data other than channel measurement feedback data and acknowledgement information. The AP1 sets the spatial reuse domain in the Common Info domain of the trigger frame to an instruction for prohibiting SRP spatial reuse and Non SRG OBSS_PD spatial reuse, that is, SRP_AND_NON-SRG-OBSS-PD-_DISALLOW. A frame transmission sequence is shown in FIG. 9.

After receiving the trigger frame, the station STA A and the station STA B will copy signaling in the spatial reuse domain of the trigger frame, that is, the SRP_AND_NON-SRG-OBSS-PD_DISALLOW, and will set a spatial reuse domain in physical layer signaling HE-SIG-A in an uplink data frame HE Trigger based PPDU also to be the SRP_AND_NON-SRG-ALSS-PD_DISAND.

The station STA1 in a BBS2 receives a radio frame, and determines, through preamble matching, that the frame is a WiFi frame. The station STA1 further determines, through repeat L-SIG, that the frame is an HE PPDU. The station STA1 further obtains HE-SIG-A by parsing, determines, according to the Format domain, that the frame is an HE-based trigger frame PDDU, and determines, according to the BSS Color domain, that this frame is from an OBSS. The station STA1 parses the spatial reuse domain and determines that the spatial reuse domain is SRP_AND-_NON-SRG-OBSS-PD_DISALLOW signaling. Therefore, the station STA disables the SRP spatial reuse and the Non SRG OBSS_PD spatial reuse, but the station STA still can perform SRG spatial reuse.

Embodiment Fourteen

In a WLAN network, especially in the WLAN network based on a next generation IEEE802.11 protocol, an AP may schedule multiple users to transmit uplink data.

Figure 10:
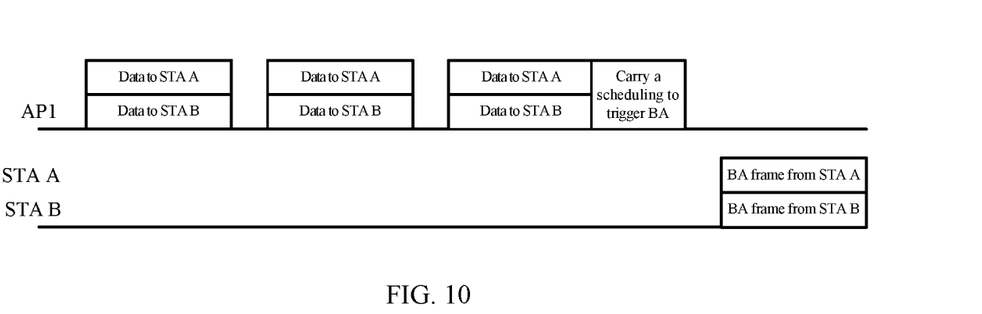
FIG. 10 is a schematic diagram of a block acknowledgement (BA) according to an embodiment.

In FIG. 3, an AP1 in a BSS1 network schedules a station STA A and a station STA B and transmits a plurality of downlink multi-user data units, where the last one of the plurality of downlink multi-user data units carries a trigger frame for scheduling the station STA A and the station STA B to send an uplink block acknowledgment (BA) as shown in FIG. 10.

A station STA1 in a BSS2 network receives a radio frame. The station STA1 determines, through preamble matching, that the frame is a WiFi frame and an HE frame, and determines, through BSS color in the physical layer, that the frame is from an OBSS network. According to the length information t (that is, a length indicated by the Length domain) in the physical layer, the station STA1 determines that t satisfies a preset threshold T, that is, t<T. The station STA1 sets the physical carrier sensing to be busy until the PPDU ends.

It should be understood that the devices and the methods disclosed in the embodiments of the present application may be implemented in other manners. The device embodiments described above are merely illustrative. For example, the unit division is merely a logical function division, and, in practice, the unit division may be implemented in other manners. For example, multiple units or components may be combined or may be integrated into another system, or some features may be omitted or not executed. In addition, coupling, direct coupling or communication connections between the presented or discussed components may be indirect coupling or communication connections, via interfaces, between devices or units, and may be electrical, mechanical or in other forms.

The units described above as separate components may or may not be physically separated. Components presented as units may or may not be physical units, that is, may be located in one place or may be distributed over multiple network units. Part or all of these units may be selected according to practical requirements to achieve objects of the solutions in the embodiments of the present disclosure.

Moreover, various function units in the embodiments of the present invention may all be integrated in one processing unit, or each unit may be used as a separate unit, or two or more units may be integrated into one unit. The integrated function unit may be implemented by hardware or may be implemented by hardware plus a software function unit.

It should be understood by those skilled in the art that all or part of the steps in the method embodiments described above may be implemented by hardware instructed by relevant programs, these programs may be stored in a computer-readable storage medium and, when executed, these programs execute steps included in the method embodiments described above; and the preceding storage medium includes: a mobile storage device, a ROM, a RAM, a magnetic disk, an optical disk or another medium capable of storing program codes.

Alternatively, the above integrated unit of the present invention may also be stored in the computer-readable storage medium if implemented in the form of a software function module and sold or used as an independent product. Based on this understanding, the technical solutions provided by the embodiments of the present disclosure substantially, or the part contributing to the existing art, may be embodied in the form of a software product. The computer software product is stored in a storage medium and includes several instructions for enabling a computer apparatus (which may be a personal computer, a server or a network apparatus, etc.) to execute all or part of the methods provided by the embodiments of the present disclosure. The foregoing storage medium includes various media capable of storing program codes, such as a mobile storage device, a ROM, a RAM, a magnetic disk, an optical disk or another medium capable of storing program codes.

The above are only specific embodiments of the present invention and are not intended to limit the present invention. It is easy for those skilled in the art to conceive modifications or substitutions within the technical scope of the present invention. These modifications or substitutions are within the scope of the present invention. Therefore, the protection scope of the present invention is subject to the scope of the appended claims.

INDUSTRIAL APPLICABILITY

Technical solutions are provided in the embodiments of the present disclosure. By determining that a radio frame is of a specified type and/or that the radio frame carries indication information indicating that reusing of the radio frame by a third party is disallowed, and maintaining a physical carrier channel detection state to be busy is maintained until the radio frame ends, the transmission success rate of the specified type radio frame is ensured and the transmission efficiency of a network is improved.

What is claimed is:

1. A radio frame transmission method, comprising:
receiving a radio frame, determining at least one of the radio frame to be a radio frame of a specified type and the radio frame carries indication information indicating that reusing of the radio frame by a third party is disallowed; and
maintaining a physical carrier channel detection state to be busy until the radio frame ends;
wherein the radio frame of the specified type comprises any one of: a null data packet frame, a null data packet announcement frame, a beamforming report poll trigger frame, a beamforming feedback frame, a radio frame with response information, a radio frame having a length satisfying a certain condition, or, a radio frame with a positioning function; and,
wherein the radio frame having the length satisfying the certain condition comprises: a radio frame whose media access control layer frame length or physical layer frame length is less than a threshold.

2. The method of claim 1, wherein before determining the radio frame to be the radio frame of the specified type, the method further comprises:
determining the radio frame carries the indication information indicating that reusing of the radio frame by a third party is disallowed; and
determining receiving energy of the radio frame is less than an energy detection threshold of an overlapping basic service set.

3. The method of claim 1, wherein in a process of receiving the radio frame, the method further comprises: maintaining a current network allocation vector unchanged.

4. The method of claim 1, wherein in a case where the radio frame comprises a triggered radio frame,
in a process of receiving the radio frame, the method further comprises: updating a network allocation vector.

5. The method of claim 1, wherein determining the radio frame carries the indication information indicating that reusing of the radio frame by a third party is disallowed comprises:
parsing a spatial reuse parameter information domain of a physical layer signaling domain, wherein the spatial reuse parameter information domain is spatial-reuse-disallow instruction information.

6. A radio frame transmission method, comprising:
sending a radio frame, wherein the radio frame is at least one of a radio frame of a specified type and carrying indication information indicating that reusing of the radio frame by a third party is disallowed, to maintain a physical carrier channel detection state to be busy until the radio frame ends;
wherein in a case where the radio frame is the radio frame of the specified type, the radio frame of the specified type comprises any one of: a null data packet frame, a null data packet announcement frame, a beamforming report poll trigger frame, a beamforming feedback frame, a radio frame with response information, a radio frame having a length satisfying a certain condition, or, a radio frame with a positioning function, and the radio frame having the length satisfying the certain condition comprises: a radio frame of a media access control layer frame or of a physical layer frame having a length less than a threshold.

7. The method of claim 6, wherein in a case where the radio frame is a radio frame of a specified type, a spatial reuse parameter information domain of a physical layer signaling domain of the radio frame carries the indication information indicating that reusing of the radio frame by a third party is disallowed,
wherein the radio frame of the specified type comprises any one of:
a null data packet frame;
a null data packet announcement frame;
a beamforming report poll trigger frame;
a beamforming feedback frame;
a radio frame with response information;
a radio frame having a length satisfying a certain condition; or
a radio frame with a positioning function.

8. The method of claim 7, the radio frame having the length satisfying the certain condition comprises: a radio frame of a media access control layer frame or of a physical layer frame having a length less than a threshold.

9. A radio frame transmission apparatus, comprising a processor and a memory for storing computer programs executable on the processor, wherein when executing the computer programs, the processor is configured to perform a radio frame transmission method,
wherein the radio frame transmission method comprises:
receiving a radio frame, determining at least one of the radio frame to be a radio frame of a specified type and the radio frame carries indication information indicating that reusing of the radio frame by a third party is disallowed; and
maintaining a physical carrier channel detection state to be busy until the radio frame ends;
wherein the radio frame of the specified type comprises any one of: a null data packet frame, a null data packet announcement frame, a beamforming report poll trigger frame, a beamforming feedback frame, a radio frame with response information, a radio frame having a length satisfying a certain condition, or, a radio frame with a positioning function; and,
wherein the radio frame having the length satisfying the certain condition comprises: a radio frame whose media access control layer frame length or physical layer frame length is less than a threshold.

10. The radio frame transmission apparatus according to claim 9, wherein before determining the radio frame to be the radio frame of the specified type, the method further comprises:

determining the radio frame carries the indication information indicating that reusing of the radio frame by a third party is disallowed; and determining receiving energy of the radio frame is less than an energy detection threshold of an overlapping basic service set.

11. The radio frame transmission apparatus according to claim 9, wherein in a process of receiving the radio frame, the method further comprises: maintaining a current network allocation vector unchanged.

12. The radio frame transmission apparatus according to claim 9, wherein in a case where the radio frame comprises a triggered radio frame,
in a process of receiving the radio frame, the method further comprises: updating a network allocation vector.

13. The radio frame transmission apparatus of claim 9, wherein in a case where the radio frame is a radio frame of a specified type, a spatial reuse parameter information domain of a physical layer signaling domain of the radio frame carries the indication information indicating that reusing of the radio frame by a third party is disallowed,
wherein the radio frame of the specified type comprises any one of:

a null data packet frame;
a null data packet announcement frame;
a beamforming report poll trigger frame;
a beamforming feedback frame;
a radio frame with response information;
a radio frame having a length satisfying a certain condition; or
a radio frame with a positioning function.

14. The radio frame transmission apparatus of claim 13, wherein the radio frame having the length satisfying the certain condition comprises: a radio frame of a media access control layer frame or of a physical layer frame having a length less than a threshold.

15. The radio frame transmission apparatus according to claim 9, wherein determining the radio frame carries the indication information indicating that reusing of the radio frame by a third party is disallowed comprises:
parsing a spatial reuse parameter information domain of a physical layer signaling domain, wherein the spatial reuse parameter information domain is spatial-reuse-disallow instruction information.

\* \* \* \* \*